(12) United States Patent
Motohashi et al.

(10) Patent No.: US 8,883,067 B2
(45) Date of Patent: Nov. 11, 2014

(54) METHOD FOR MANUFACTURE OF TRAY

(75) Inventors: Yoshinori Motohashi, Osaka (JP); Takaya Niimi, Osaka (JP)

(73) Assignee: Kyoraku Co., Ltd., Tokyo (JP)

( * ) Notice: Subject to any disclaimer, the term of this patent is extended or adjusted under 35 U.S.C. 154(b) by 207 days.

(21) Appl. No.: 13/338,315

(22) Filed: Dec. 28, 2011

(65) Prior Publication Data
US 2012/0168988 A1 Jul. 5, 2012

(30) Foreign Application Priority Data
Dec. 29, 2010 (JP) ................. 2010-294575

(51) Int. Cl.
B23Q 1/25 (2006.01)
B29C 51/36 (2006.01)
B23Q 3/02 (2006.01)
B29C 33/30 (2006.01)
B29C 51/26 (2006.01)
B29C 51/30 (2006.01)
B29C 51/08 (2006.01)
B29L 31/00 (2006.01)
B29C 51/10 (2006.01)

(52) U.S. Cl.
CPC ............... B29C 33/30 (2013.01); B29C 51/26 (2013.01); B29C 51/30 (2013.01); B29C 51/082 (2013.01); B29L 2031/7178 (2013.01); B29C 51/10 (2013.01); B29C 2791/007 (2013.01)
USPC ......... 264/571; 264/219; 425/175; 269/289 R

(58) Field of Classification Search
USPC .................................... 264/551, 571
See application file for complete search history.

(56) References Cited

U.S. PATENT DOCUMENTS

| | | | | | |
|---|---|---|---|---|---|
| 3,107,396 A | * | 10/1963 | Fowler, Jr. et al. | ............ | 425/193 |
| 3,219,307 A | * | 11/1965 | Leeds et al. | .................... | 425/388 |
| 3,225,461 A | * | 12/1965 | Snyder | ......................... | 434/132 |
| 3,381,068 A | * | 4/1968 | Leiper et al. | .................. | 264/550 |
| 3,496,607 A | * | 2/1970 | Larson | .......................... | 425/193 |
| 3,632,252 A | * | 1/1972 | Amberg et al. | ............... | 425/168 |
| 4,061,706 A | * | 12/1977 | Duffield et al. | ............... | 264/571 |
| 4,244,915 A | * | 1/1981 | Boardman | ..................... | 264/551 |
| 4,363,617 A | * | 12/1982 | Hirsekorn | ...................... | 425/388 |
| 4,379,687 A | * | 4/1983 | Wilson et al. | ................. | 425/388 |
| 4,551,084 A | * | 11/1985 | Lake | .............................. | 425/185 |
| 5,217,563 A | * | 6/1993 | Niebling et al. | .............. | 156/382 |
| 5,633,022 A | * | 5/1997 | Myers | ............................ | 425/384 |
| 6,257,866 B1 | * | 7/2001 | Fritz et al. | .................. | 425/387.1 |
| 6,332,769 B1 | * | 12/2001 | Bashor et al. | ................. | 425/388 |
| 6,394,783 B1 | * | 5/2002 | Dalgewicz et al. | ........... | 425/388 |

FOREIGN PATENT DOCUMENTS

JP 2006-016035 1/2006
JP 2007-160894 6/2007

\* cited by examiner

Primary Examiner — Matthew Daniels
(74) Attorney, Agent, or Firm — Maine Cernota & Rardin

(57) ABSTRACT

A method for manufacture of a resin tray is provided where a block mold is selected to be installed in a base mold according to the specification of the tray to be molded; a molding surface is composed of the upper surface of the block mold fixed to the base mold; thermoplastic resin material in the molten state is arranged opposite to the cavity; a step where thermoplastic resin material is molded by pushing it against the cavity; and as a result, recess part stored at a prescribed position.

2 Claims, 11 Drawing Sheets

METHOD FOR MANUFACTURE OF TRAY

RELATED APPLICATIONS

This application claims priority to Japanese Patent Application No. 2010-294575, filed Dec. 29, 2010, which is herein incorporated by reference in its entirety for all purposes.

FIELD OF THE INVENTION

This invention is related to method for manufacture of tray. More specifically, it relates to molding method of tray that can efficiently prepare mold.

BACKGROUND OF THE INVENTION

Traditionally, since the tray made from resin is light weight and rigid so it is used to store and transport heavy load such as shafts for vehicles, vehicle engine, finished goods and luggage etc. Resin tray is molded by using mold and it is necessary to prepare the mold for forming storage recess suitable for internal and external structure and size of stored goods. The block mold intended for general-purpose mold is disclosed in patent document 1. More specifically patent document 1 discloses that the mold is composed of a fixed mold and a movable mold for the palette made of the resin which is one side use type for molding lower half body that has the opening that penetrates vertically. By assuming either of molds as base mold, mold piece inserted for rib formation in mold is installed and some light weight type ribs and lot of high strength type ribs are molded by exchanging the inserted mold piece with changed thickness and number of ribs. However, the following technical points are considered according to such a general-purpose mold. That is, if there are many mold parts, the molding work efficiency is low, and the management cost increases. Especially, when the storage goods are elongated structure shaft of the circular section, a ditch is installed in the outline of the storage goods in the bottom so that rolling, breakdown does not cause any damage in the storage area where the storage goods are formed in the bottom of the tray. It is necessary to set and position the storage goods in this ditch. In this case, it does not fit if the block mold is prepared according to the outline of entire mold and if number of mold increases.

In addition, when minor change is done with the product that is to be stored, in every case block mold for base mold is rebuilt and considerable time is required to prepare the mold as arrangement for base mold is changed, and it becomes difficult to do an efficient molding. Thus, Flexible efficient mold preparation is demanded by the industry when goods to be stored are slightly changed.

The resin material in the molten state that should be molded between a pair of split molds (oppositely arranged) is arranged. Internally confined space is formed by clamping a pair of split mold. The blow pressure is put in the confined space. The technology that molds by pressing the resin material against the cavity is indicated. Especially, a detachable inserted piece is prepared for the cavity of the mold. The point to select the inserted piece according to the molded piece is indicated in patent document However, a mark is carved on the surface of the product and externals, and size of entire molded piece is not changed.

SUMMARY OF THE INVENTION

One embodiment of the present invention provides a method for manufacture of a resin tray comprising: a step where a block mold is selected to be installed in a base mold according to the specification of the tray to be molded; a step where a molding surface is composed of the upper surface of the block mold fixed to the base mold; a step where thermoplastic resin material in the molten state is arranged opposite to the cavity; a step where thermoplastic resin material is molded by pushing it against the cavity; and as a result, recess part stored at a prescribed position.

DETAILED DESCRIPTION

Figure 1:
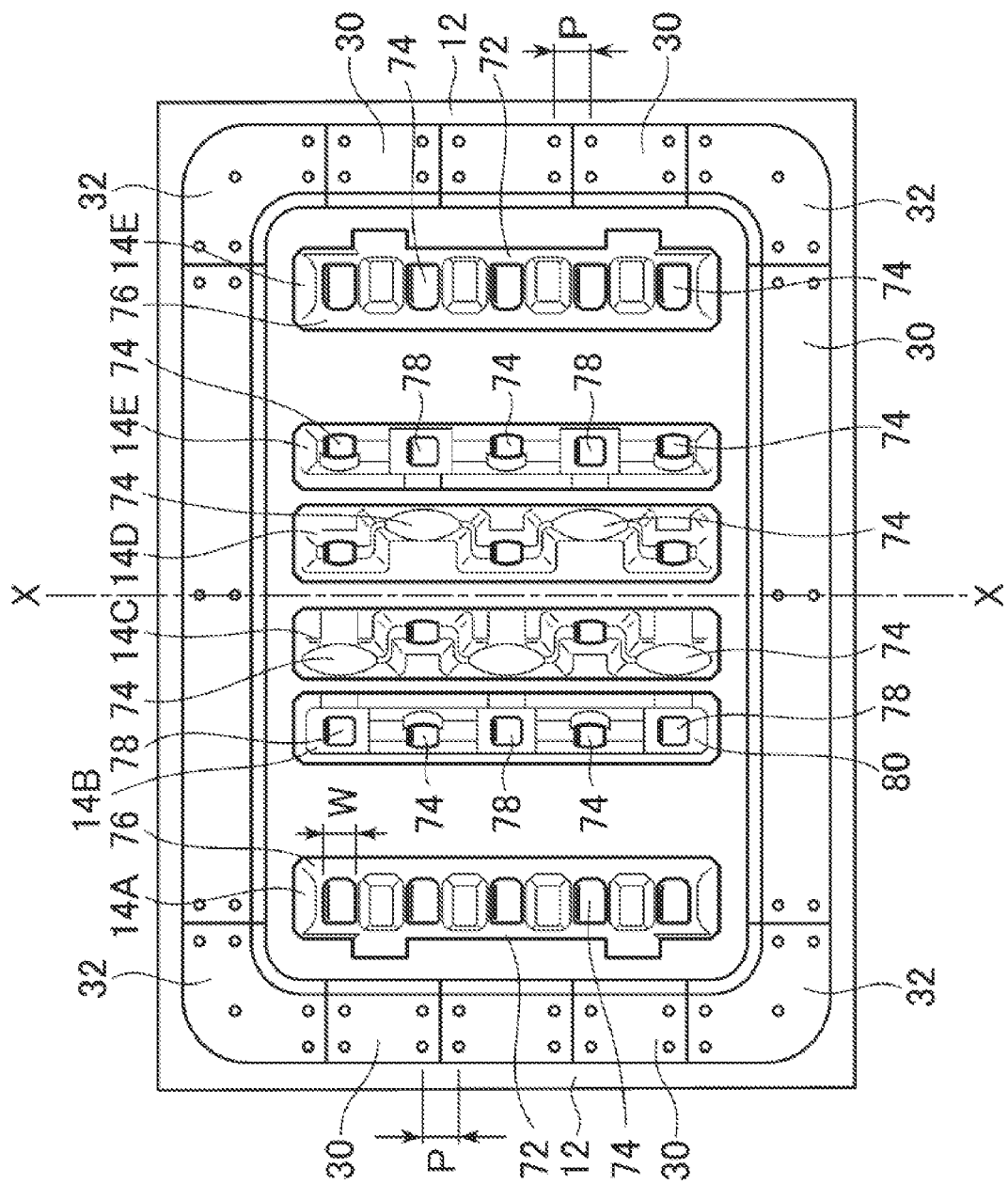
FIG. 1 is a plane figure of the mold of the tray made of the resin of the first embodiment of this invention.

The purpose of this invention is to offer the forming method of tray that can efficiently prepare the mold used to mold the tray.

The selection phase of the above-mentioned block mold should contain the stage where a fixed position to the cavity of the base mold of the above-mentioned selected block mold is selected. Method of forming the resin tray comprises, inserted piece that should be set in the concave portion of the selected block mold, the stage where the concave portion that should be set is selected, the stage where shaping surface is composed of the upper surface of the block mold and inserted piece fixed by fixing the selected block mold to the cavity of the base mold, and fixing selected inserted piece to the concave portion of the selected block mold, the stage arranged opposite to the above mentioned cavity so as to take out the sheet thermoplastic resin material in the molten state from the above-mentioned cavity, the stage that dilutes the thermoplastic resin material in the molten state by pressing sheet thermoplastic resin material in the molten state against the above-mentioned cavity. As a result, the ditch part where material is stored at a prescribed position of the sheet thermoplastic resin material is formed with the upper surface of the above-mentioned block mold and the above-mentioned inserted piece on the other side and the side opposite to the cavity of the sheet thermoplastic resin material.

When molded piece is a tray and when elongated structure S of shaft is stored in inner part of tray, first embodiment of method of forming the mold of resin tray is explained below with reference to the drawing. Shaft elongated structure S is a heavy load like the shaft to which the rotation drive power is transmitted for instance with the rotation symmetry structure that axially centers the circular section, and possesses the middle enlarged diameter.

First of all, it explains the molding equipment of tray T as follows. The molding device of tray T comprises mold clamping device of the mold arranged under the extrusion device and the extrusion device of melted resin. A cylindrical parison in the molten state extruded from the extrusion device is sent to the mold clamping device as a thermoplastic resin sheet. A thermoplastic resin sheet in molten state is molded with the clamp molding device. The extrusion equipment is an already known type so far, and continuous cylindrical parison of prescribed length is pushed out through extrusion slit though the detailed explanation is omitted. Thermoplastic resin sheet is suspended between split molds 10 of the clamp molding device.

Extrusion slit is arranged perpendicularly downward and cylindrical parison pushed from extrusion slit 91 suspended from extrusion slit 91 as it is sent perpendicularly downward. A pair of roller 92 i.e. driving roller and other driven roller is arranged under extrusion slit 91. When suspended cylindrical parison from extrusion slit 91 is passed through a pair of roller 92, it is arranged between the split mold by considering the flat thermoplastic resin sheet together with downward extrusion.

The clamp molding device comprises a pair of split mold and mold drive device. Two split molds are arranged opposite to the cavity. The cavity is arranged respectively along perpendicular direction. The unevenness is installed on each surface of the cavity according to externals and the surface figure of the molded piece molded based on the thermoplastic resin sheet in molten state. Since two splits molds have similar structure, one of them is explained below.

Figure 3:
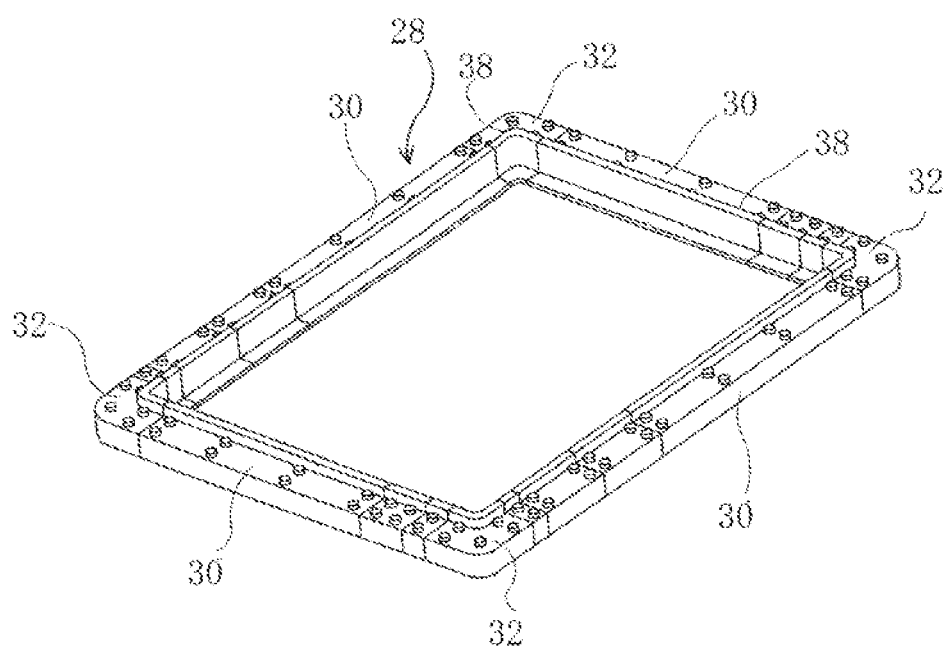
FIG. 3 is the total squint chart of the part that shows only circular body by block mold in mold of resin tray of FIG. 1.

With reference to FIG. 1 or FIG. 3, mold 10 for forming resin tray comprises base mold 12 and two or more block mold 14. Base mold 12 comprises plane installation side 16 where two or more block molds 14 respectively are installed. As explained back, two or more block molds are installed at the prescribed position of selected installation side 16 as per the specifications of the tray T to be molded. Two or more block mold 14 comprises bottom 18 that touches installation side 16 and side 20 composed of shaping surface 39. (Refer FIG. 4).

Figure 2:
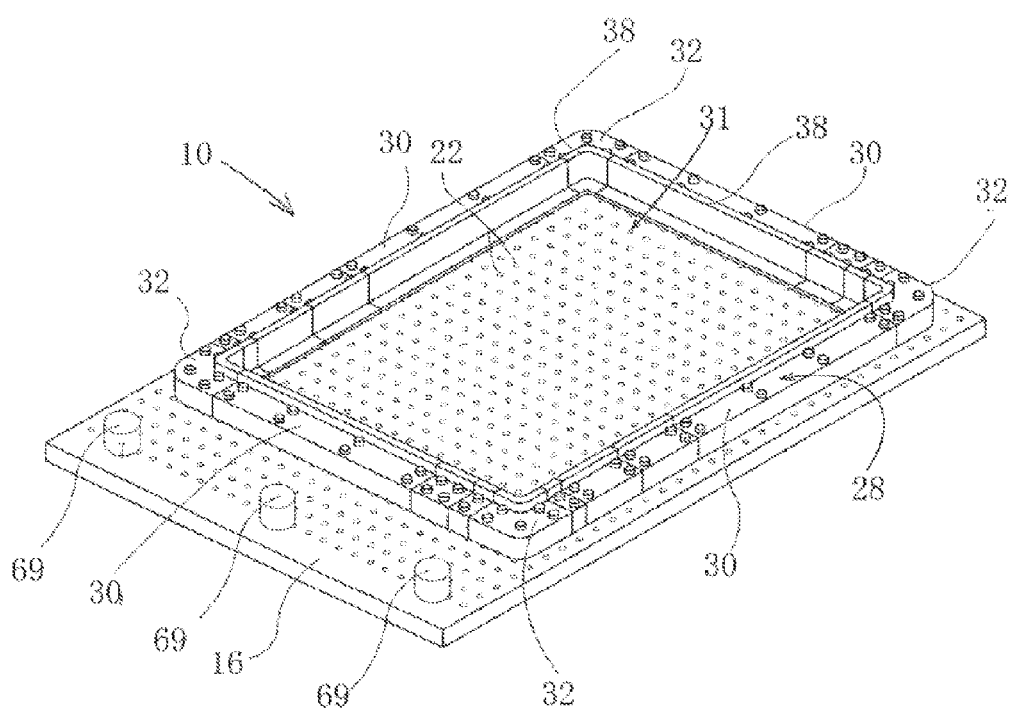
FIG. 2 is the total squint chart of the state of formation of circular body with block mold of mold of tray made from resin of this embodiment.

Installation side 16 comprises the area that corresponds to the maximum size of goods for molding as shown in FIG. 2, and two or more screw holes 22 (tap hole) are installed on installation side 16 like the lattice of prescribed pitch p. For instance, installation side 16 is 2000 mm in width, 1125 mm in length, and pitch p of screw holes 22 is 50 mm. Two or more block molds 14 comprises screw 24 that can be screwed in screw hole 22 on bottom 18 and it is screwed in screw hole 22 by special fixation screw 26. Two or more block molds 14 are divided roughly into the two types i.e. 1st type composing is circular body installed on installation side 16 and second type installed on installation side 16 in circular body.

First type comprises extended block 30 of linear shape and corner block 32 of L shape as shown in FIG. 3. Two or more extended block 30 and four corner blocks 32 are connected with respective end surface 34 to suit the specification of the moulded piece; especially the outline and circular body 28 is formed on the installation side. Circular top part 36 of circular body 28 composes pinch-off part 38, and the medial region of circular body 28 on installation side 16 composes cavity 31.

Figure 4:
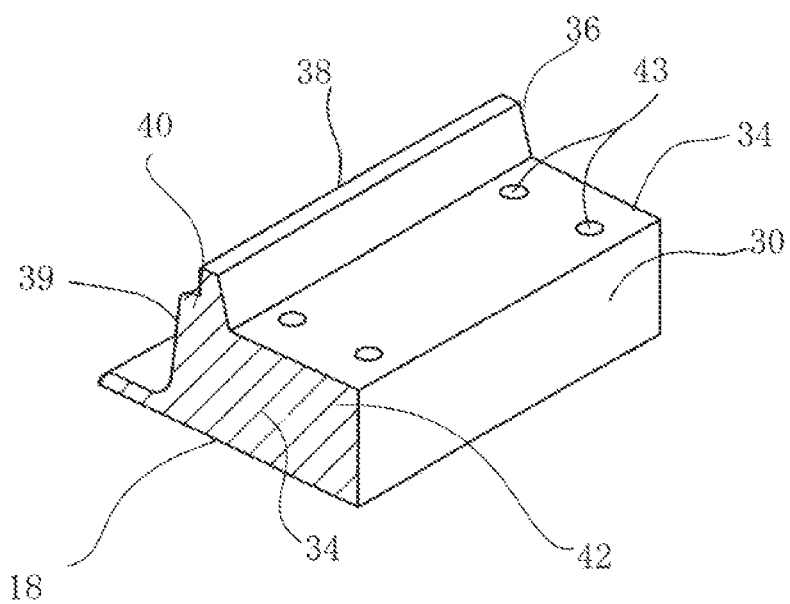
FIG. 4 is an oblique perspective figure that shows a part of the block mold.
Figure 5:
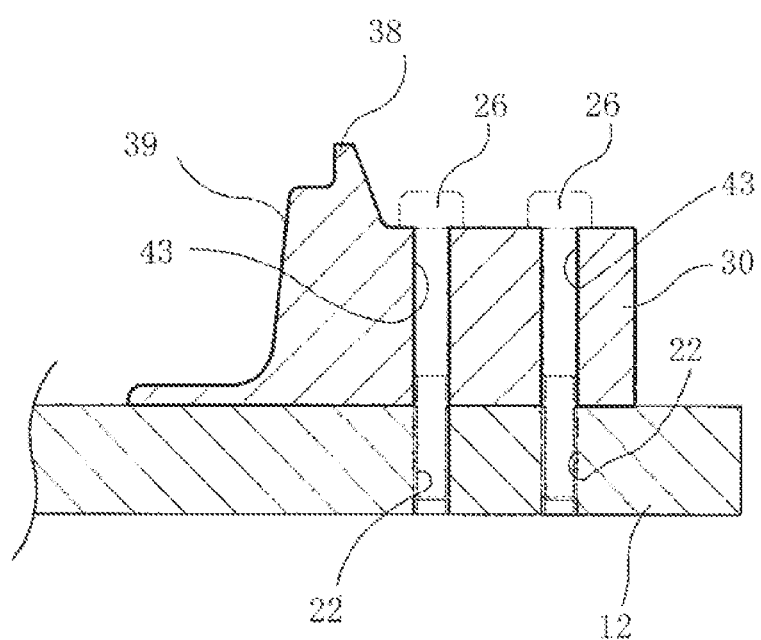
FIG. 5 is a partial cross section of the mold of the tray made of the resin of FIG. 1.

In detail, as shown in FIG. 4, extended block 30 and corner block 32 both have L character section. Pinch-off part 38 is formed in the top part of perpendicular part 40. Shaping side 39 that forms the standing wall of the moulded piece stands upright to cavity 31 in pinch-off part 38. On the other hand, screw hole 43 for screwing block mold 14 on installation side 16 is installed on horizontal part 42. Horizontal part 42 is made outward and it is fixed to installation side 16 with fixation screw 26 (Refer to FIG. 5).

As shown in FIG. 3, As for enhancing block 30, different required numbers are prepared for perpendicular length (for instance, four types (50 mm, 75 mm, 100 mm, and 500 mm in length)). After fixing four corner blocks 32 respectively according to the outline of the moulded piece to installation side 16 at the position corresponding to the four corners of the moulded piece, extended block 30 is properly selected, and it is fixed on installation side 16 as per the distance in horizontal direction and the vertical direction of adjoined corner block 32 (50 mm, 75 mm, and 500 mm are arranged in horizontal direction one by one, and 1 of 50 mm, 2 of 10 mm and 1 of 500 mm are arranged in figure).

Pinch-off part 38 is formed in the circumference of cavity 31, and thus, this pinch-off part 38 is formed to the circular circumference of cavity 31 and projects toward the opposed mold to the in each of two split molds. As a result, when two split molds are clamp moulded, airtight space is formed internally by touching the tip of pinch off part 38.

Figure 11:
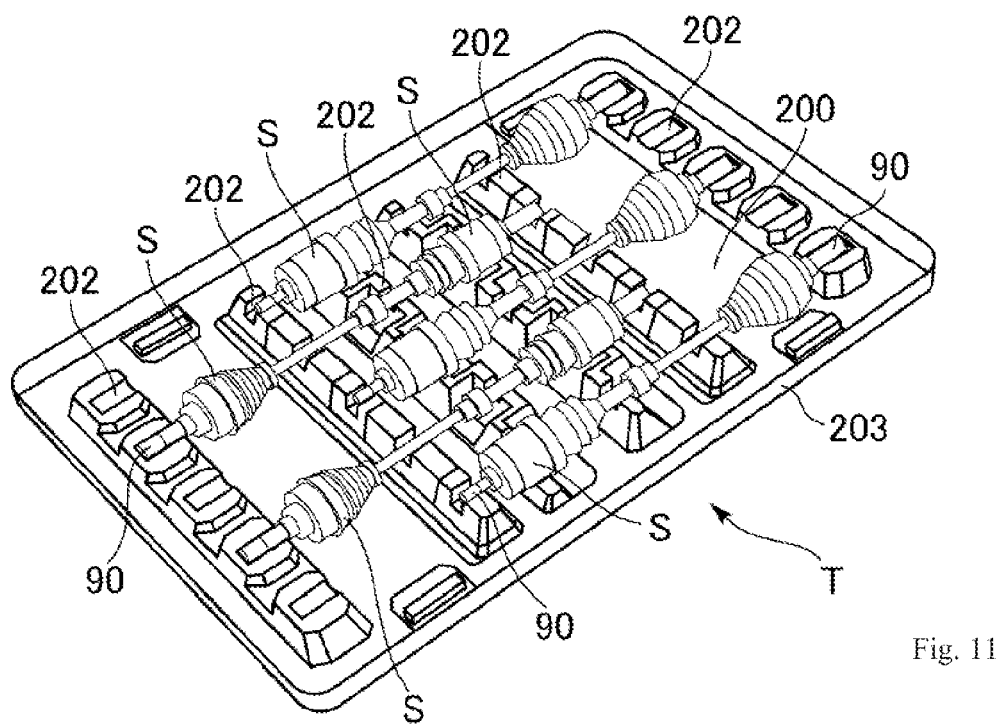
FIG. 11 is an oblique perspective figure of tray T molded with the forming method of the tray made of the resin that lies in the first embodiment of this invention.

As for block mold 14 of the second type, the line arrangement is done in inner side of circular body 28 as shown in FIG. 1. The fixation method of cavity 31 is similar to the case of the block mold of the first type. Respectively, the block mold 14A or 14F has the length that corresponds to length nearer to the rectangular storage area of two or more elongated structures S stored in parallel. It has the bottom that touches cavity 31 and upper surface 72 that composes shaping side. Six projection parts 202 that correspond to externals of the block mold are formed in the longer direction in bottom 200 of tray T at intervals. Six block molds are mutually arranged in the longer direction in cavity 31 (pushing direction of melted resin, right and left direction in FIG. 1) at intervals. It has the size where edge or middle part of elongated structure S can be installed respectively. Two or more concave parts 74 where a prescribed interval was mutually separated are installed in the longer direction according to specification and arrangement elongated structure S. Especially, in the block mold 14A and 14F arranged at the top and bottom of cavity 31. Two or more concave parts 74 come off to the other side 76 of the block mold respectively and it has the width that corresponds to the shaft diameter of elongated structure S. It is arranged opposite to side 76 by separating the intervals that correspond to the length of rectangular storage area. As a result, ditch 90 where the edge of a minute diameter of elongated structure S is installed is formed in moulded tray T as shown in FIG. 11. On the other hand, inserted piece 78 is arranged in concave part 74 in block mold 14B and 14E. More concretely, inserted piece 78 is fixed to one to three places of concave part 74 in block mold 14B and inserted piece 78 is fixed to one to two places of concave part 74 in block mold 14E.

Figure 6:
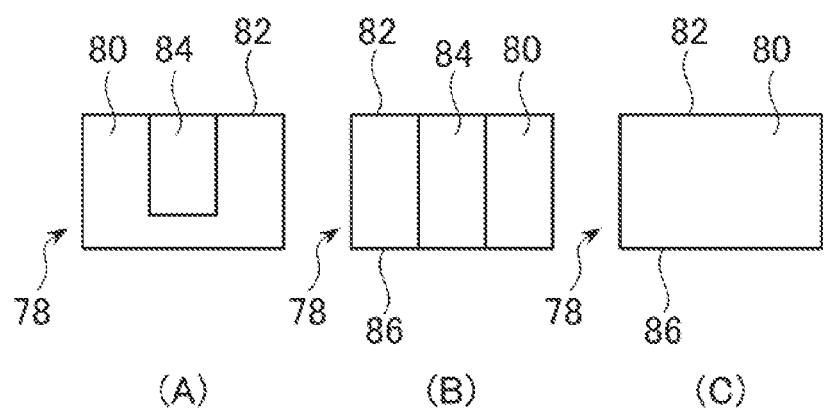
FIG. 6 is an outline plan of inserted piece used for the mold of the tray made of the resin that lies in the first embodiment of this invention.

Inserted piece 78 has the shape to get stuck to two or more concave parts 74. Two or more inserted piece 78 comprises upper surface 80 composed of shaping side. As a result, block mold 14 required for moulding is selected from among two or more inserted piece 78 and two or more block molds 14 according to the specification and the arrangement of elongated structure S. Concave part 74 of selected block mold 14 with which selected inserted piece 78 is to be engaged is selected. It is used to mold the resin material in the molten state arranged opposite to cavity 31. Upper surface 80 of inserted piece 78 stuck in concave part 74 should be formed smoothly with upper surface 72 of block mold 14 corresponding to circumference of concave part 74. As shown in FIG. 6, two or more inserted piece 78 has Type A (FIG. 6(A)) that provides concave part 84 having width w corresponding to the shaft diameter of elongated structure S where it comes off to other side 82 on upper surface 80, Type B (FIG. 6(B)) that provides concave part 84 having width w corresponding to the shaft diameter of elongated structure S where it comes off on both sides 82, 86 extending upper surface 80 and Type C (FIG. 6(C)) with almost flat upper surface 80. Type A is suitable when the ditch part where the edge of elongated structure S is formed, type B is suitable when the ditch part where middle part elongated structure S is formed and type C is especially suitable when elongated structure S is not supported by projection part 202 formed with block mold 14.

Two or more inserted piece 78 possesses the fixed screw (not shown in the figure) that can screw downward in concave part 74 or has the screw hole (Do not show in the figure) that comes off downward from the upper surface 80. It is fixed in concave part 74 with a fixed screw (not shown in the figure) separately. The screw hole is not installed in the upper surface where shaping side is composed. Especially, when shaft elongated structure S has middle extended diameter part, height from the surface of cavity 31 of the bottom of concave part 74 is set more than the diameter of middle extended diameter part in inserted piece 78 installed in block mold 14B, 14E. As a result, both ends of elongated structure S are supported by the bottom of concave part 74 of corresponding block mold 14 or concave part 84 of inserted piece 78 correspond.

Screw having screw part that can be screwed in screw hole 22 and screw head installed on edge of screw part is prepared besides block mold 14. Screw is screwed with screw hole 22 where block mold is not installed on screw hole 22 of cavity 31 and Screw receiving hole 22 has been closed with the screw head.

On the installation side 16 outside the circular body 28, the spacer 69 with similar height of pinch-off part 38 is screwed with installation side 16 as well as block mold 14 as shown in FIG. 2. Pinch-off part 38 is protected by reducing the load on pinch-off part 38 at the time of clamp molding of the mold. Pinch-off part 38 can be effectively protected by adjusting the position where spacer 69 is set up in proportion to the size of composed circular body 28.

Tow split molds is driven respectively by the mold drive device though the explanation of the mold drive device is omitted as before. Thermoplastic resin sheet is arranged between two split molds 10 in open position. On the other hand, pinch-off part 38 of two split molds 10 bounds at the close position. Since circular pinch-off part 38 bounds mutually, the sealed space is formed in two split molds 10. In split mold 10, continuous holes are installed so that air passes through it and sealed up space is created to introduce compression air from outer side of mold so that blowing pressure is put in sealed up space formed by both split molds at the time of mold clamping of molds. An already-known blow pin (not shown in the figure) can be set up.

The resin material of tray T is a thermoplastic resin. It is Olefin resins such as polyethylene and polypropylenes or amorphous resin in detail homopolymers of olefin such as ethylene, propylene, butene, Pentene, isoprene and Methyl pentene etc. and copolymers such as Polyolefin ((for instance, polypropylene and high-density polyethylene).

The manufacturing process of tray T where mould device of tray T having the above composition is explained with reference to the figure.

First of all, two or more block molds 14 that should be installed in base mold 12 according to the specification of tray T that should be molded are selected. More specifically, extended block 30 and corner block 32 of the first type are selected to form circular body 28 that suits the outline of tray T, block mold 14 of the second type is selected, and the installation position is decided. Concretely, 5 shaft shaped elongated structure S that has the middle diameter expansion part as shown in FIG. 11 are alternately arranged offset along the boundary of the tray T. Block mold 14A or 14F are fixed in total six places which are position corresponding to both terminal part of two length scale structures S, position corresponding to both terminal part of three length scale structures S and position corresponding to the middle part of elongated structure S.

Selected block mold 14 is screwed and fixed in the prescribed position of installation side and circular body 28 is formed and cavity 31 is composed in inner part of circular body 28. Next, inserted piece 78 that should be adopted is selected, and it is fixed to concave part 74 where block mold 14 corresponds in the block mold 14 respectively. Inserted piece 78 is fixed to concave part 74 in every one or two places respectively of block mold 14E and inserted piece 78 is fixed to concave part 74 in every one or three places of block mold 14B. In this case, inserted piece 78 of type A is adopted from the accommodation of the terminal part of a minute diameter of elongated structure S, and the terminal part is stored in concave part 84 installed on upper surface 80 of inserted part 78. Screw is screwed to all screw holes where block molds are not installed in cavity 31 and screw receiving hole 22 are closed.

Figure 7:
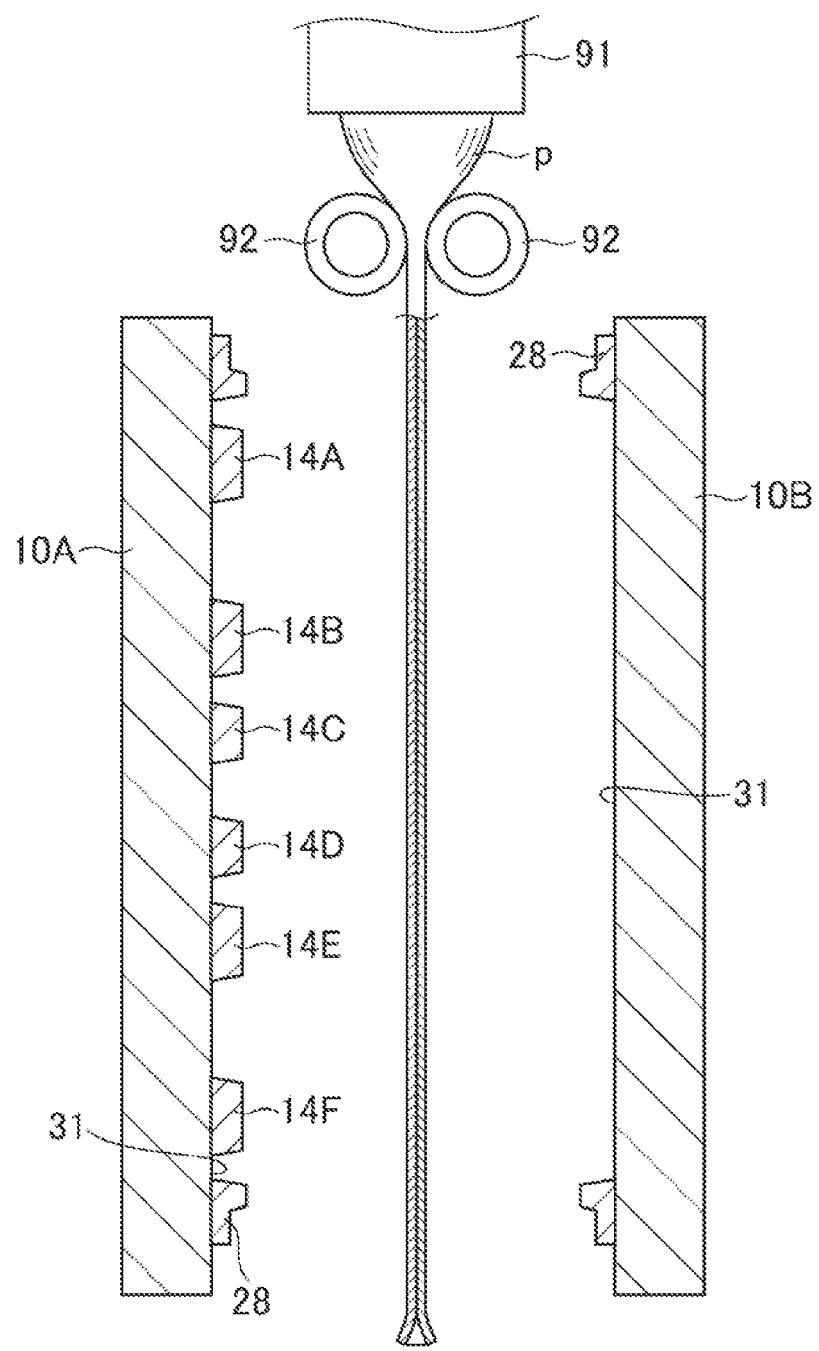
FIG. 7 is a diagram In the method of forming the tray made of the resin that lies in the first execution form of this invention, it is a mode with which resin tray T is molded, and a cross section view where the state to arrange a seat in the molten state thermoplastic resin between molds for a pair of molding is shown.
Figure 8:
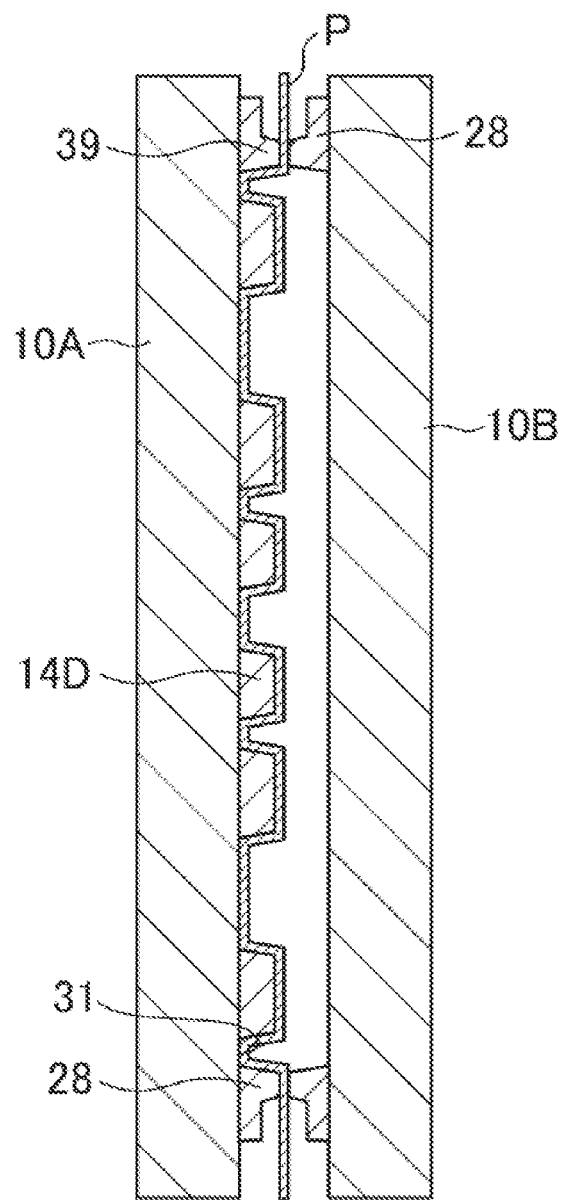
FIG. 8 is the cross section view showing clamp molding of a pair of mold and the state in which the melted resin by blowing air is molded along the shape of cavity in the method of formation of resin tray of embodiment 1 of this invention.

As shown in FIG. 7, thermoplastic resin reserved from extrusion slit 91 is pushed intermittently per time unit and the thermoplastic resin is a swell and it is pushed at prescribed extrusion rate in prescribed thickness so that cylindrical parison in molten state is suspended in downward direction. Next, a cylindrical parison is sent off downward by passing between a pair of rollers 92, it is made flat and it becomes thermoplastic resin sheet, and is arranged between split molds 10. Split mold 10 is clamp molded and sealed space is formed in mold as shown in FIG. 8.

Figure 9:
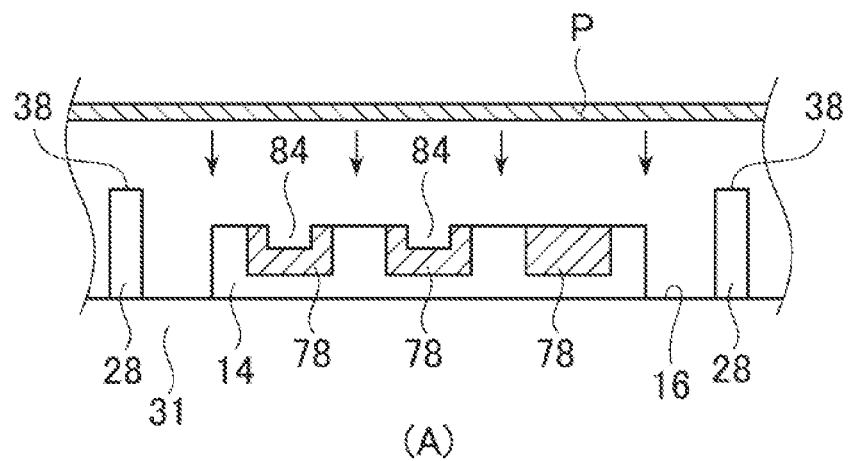
FIG. 9 is partial cross section view showing the situation where melted resin is molded with inserted piece and block mold in the formation method of resin tray of embodiment 1 of this invention.
Figure 9:
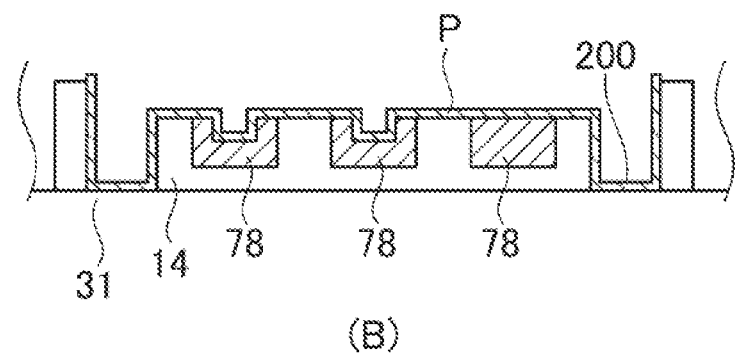

As shown in FIG. 9, side wall 203 is shaped by shaping surface 39 of circular body 28 and shape is given corresponding to block mold 14 on the side opposite to cavity 31 of thermoplastic resin sheet. As a result, projection part 202 is formed toward respect on side and the other side opposed to cavity 31 of a thermoplastic resin sheet. Ditch part 90 where it can accommodate elongated structure S is formed with concave part 84 of inserted piece 78 installed in concave part 74 or block mold 14 on projection part 202.

Figure 10:
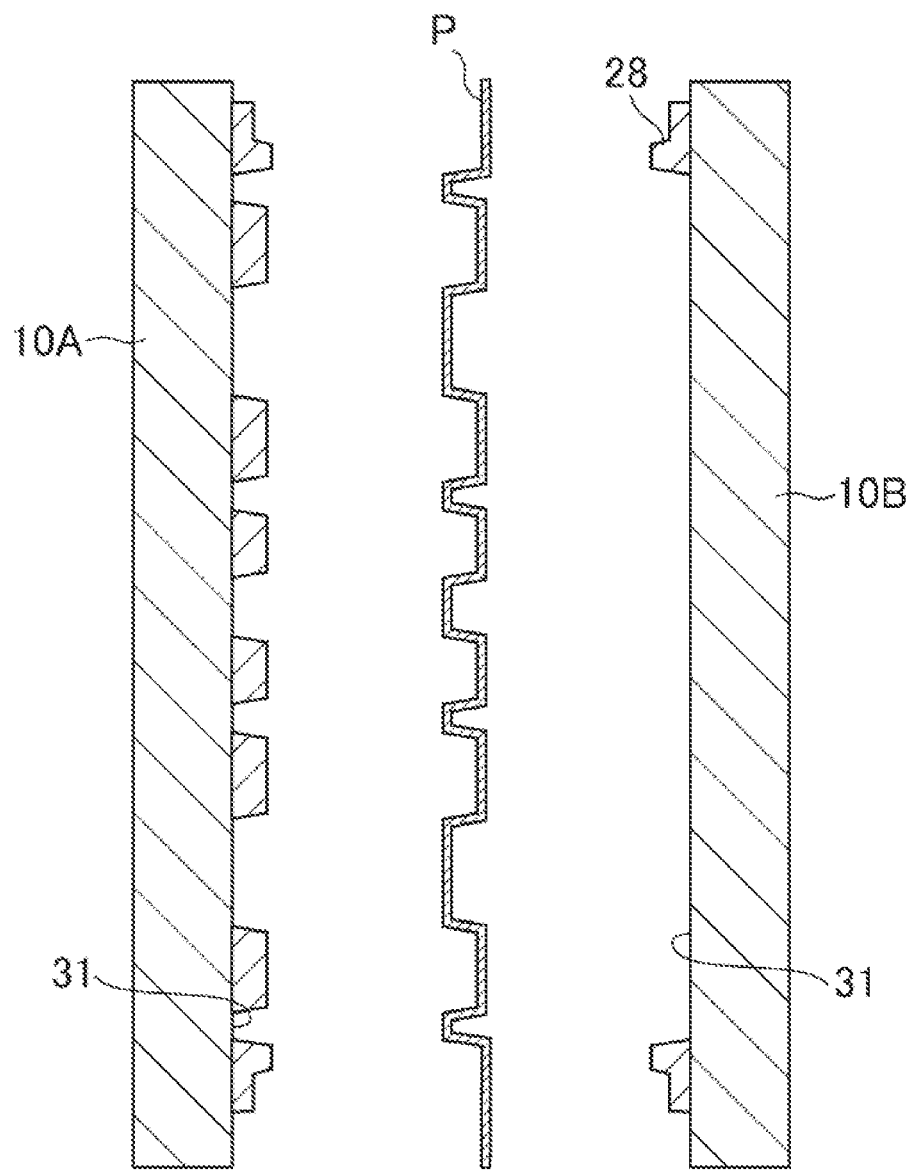
FIG. 10 is cross section showing the state where the molded piece is taken out by opening a pair of mold after cooling from the state of FIG. 8.

Next, split mold 10 is opened as shown in FIG. 10, and molded tray T is taken out, part B Bali outside pinch-off part 38 is cut, and molding is completed. As mentioned above, whenever a cylindrical parison in the molten state is pushed out intermittently, tray T can be molded one after another by repeating the above-mentioned process. The thermoplastic resin is intermittently pushed out as a cylindrical parison in the molten state by extrusion molding. Pushed out cylindrical parison is molded in prescribed shape by using mold as thermoplastic resin sheet. Similarly when it is not pushed out as cylindrical parison, it can be molded in the prescribed shape by using mold and by pushing out molten state thermoplastic resin sheet by direct T die.

Resin material molded in sheet shape should be melted by reheating just before molding without directly molding the thermoplastic resin sheet in molten state pushed out downwards from pushing machine.

Split mold 10 is clamp molded and sealed space is formed in split mold 10 and by putting blow pressure from this sealed space, Not only thermoplastic resin sheet is formed but also sealed space is formed between thermoplastic resin sheet and cavity 31 before clamp molding split mold. Resin material is preliminarily molded by absorbing thermoplastic resin sheet from cavity 31. In addition, thermoplastic resin sheet can also be molded by putting the blow pressure from the sealed space after clamp molding of division mold 10. In this case, the vacuum suck room (Do not show in the figure) is set up in division mold 10. Vacuum suck room through suck hole (not shown in figure) can be communicated with cavity 31 and thermoplastic resin sheet opposite to cavity 31 is sucked through sucking hole from vacuum suck room. It can be molded in shape along the outer surface of cavity 31. Thermoplastic resin sheet opposite to cavity 31 is moved up to upper surface of thermoplastic resin sheet opposite to mold 10. Next, it only has to suck from the vacuum suck room through the suck hole through the sealed up space composed by the surface of the outer side of thermoplastic resin sheet opposed to cavity 31 of mold 10, inner side of the molded frame and mold 10.

In this method, excellent molding of complex shape can be secured by carrying out preliminary molding before this molding. When clamp molding of split mold 10 is carried out, thermoplastic resin sheet can be molded by putting blowing pressure from sealed space by sucking thermoplastic resin sheet from cavity 31. According to this method, an excellent molding can be similarly secured by putting the blow pressure and removing the air collected in concave part 74 of cavity 31 by the suck. Tray T molded with the above-mentioned forming method has the following compositions.

Molded piece Tray T is the rectangular container with bottom 200. Bottom 200 composes the storage space of elongated structure S. Six projection parts 202 are formed at a prescribed position in bottom 200 according to the position where elongated structure S is stored. Ditch part 90 where it accommodates elongated structure S is formed on each projection part 202.

Moreover, since bottom 200 is formed with side opposed to cavity 31 of the resin material in the molten state and other side at the time of molding. Two or more protrusion parts of the circular geometry arranged like the lattice (not shown in the figure) are formed with flat screw head screwed with screw hole 22 of cavity 31. It can be used to position elongated structure S by two or more protrusion parts.

Tray T is one object of formed thermoplastic resin and the thickness of thermoplastic resin that composes the thickness of tray T is properly provided as per the weight of elongated structure S stored in tray T. When the weight of elongated structure S is heavy, for instance when the elongated structure S is metallic engine parts, in the formation of thermoplastic resin, cylindrical parison should be crushed by passing between a pair of rollers 92 and it should be processed in sheet shape with thickness that corresponds to double the parison thickness before forming the cylindrical parison of molten state pushed out from pushing out machine. According to the mold of the tray made of the resin that has the above-mentioned composition, when tray T that stores shaft of the circular section two or more elongated structures S in parallel are molded, the ditch where the whole elongated structure S is set is not installed in the storage area in the form that projects from the bottom of tray T downward. Elongated structure S can be positioned by setting it in the ditch where the edge of elongated structure S and the middle part are formed in the part that projects from the floor face in the storage area. According to the specification and the arrangement of elongated structure S, inserted piece 78 and block mold 14 necessary for molding are selected from among two or more inserted piece 78 and two or more block mold 14. The concave part 74 of selected block mold 14 to be engaged with selected inserted piece 78 is selected. Shaping surface is composed of upper surface 80 of inserted piece 78 set in concave part 74 of block mold 14 and concave part 74 of upper surface 72 of block mold 14 installed on cavity 31 of base mold. It can be used to mold the resin material in the molten state arranged opposing to cavity 31. At this time, specifications of elongated structure S such as shaft diameter, shaft length, diameter of diameter expansion part, Position etc. are mainly changed. As a result, when the number, arrangement or the position where elongated structure S stored in tray T is supported is changed. While the arrangement of the longer direction in the rectangular storage area of block mold 14 is changed. Concave part 74 of block mold 14 with changed arrangement is changed and mold can be prepared without changing all the block mold 14 separately, As a result, the mold used to mold tray T that stores a shaft of the circular section elongated S can be efficiently prepared.

Second embodiment of this invention is explained in detail as follows. In this embodiment, the explanation of the components similar to the first embodiment is omitted by giving same reference numbers. Some structures of edge of elongated structure S of shaft to be stored in tray T are somewhat changed and in first embodiment, inserted piece 78 of C type is used in this embodiment along with the inserted piece 78 of type A used in first embodiment.

Figure 12:
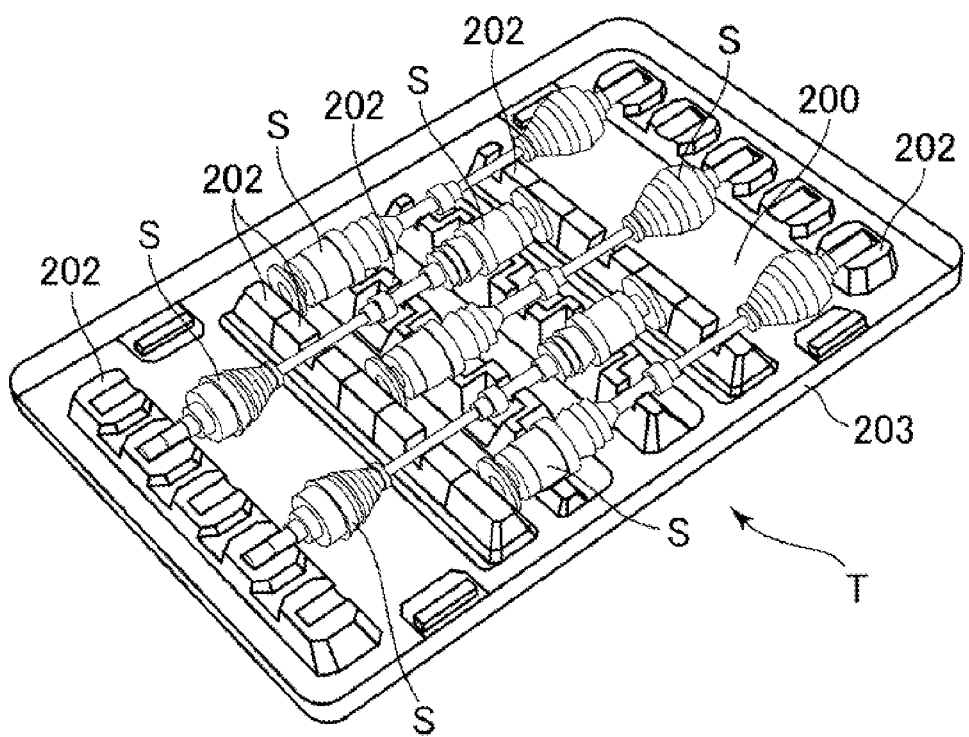
FIG. 12 is an oblique perspective figure of tray T molded with the molding mold of the tray made of the resin that lies in the second embodiment of this invention.

As shown in FIG. 12, 5 shaft shaped elongated structures S to be arranged and the arrangement in tray is similar to the embodiment 1. There is no change in the arrangement of block mold, the structure of elongated structure S of shaft is terminated by shaft diameter and in this embodiment it is terminated by extended shaft. Terminal part of small diameter shaft is accommodated in first embodiment, in each mold block 14B and 14E, inserted piece 78 of A type is adopted (one in every three in the mold block, and one in every 2 in the mold block), and small diameter shaft end is accommodated in concave part 74 of inserted piece 78. In this embodiment, though the terminal part of large diameter shaft is accommodated, inserted piece 78 of C type is adopted at the position similar to the first embodiment. The terminal part of large diameter shaft is positioned so that it touches the side of projection part formed by inserted piece 78.

Circular body 28 is formed according to the outline of tray T where installation side 16 of base mold 12 should be molded with block mold 14 of the first type. Cavity 31 is formed in circular body 28, and circular top part 36 of circular body 28 forms pinch-off part 38. Composing the shaping surface 39 with which inside side 20 in pinch-off part 38 molds surroundings wall 203 of tray T is similar to the first embodiment.

Though the method of formation of such tray T is almost similar to the first embodiment, the storage side composing the surface opposed to cavity 31 of the resin material in the molten state and surface on the other side and stores elongated structure S. It is desirable that the screw head of the screw used to close screw receiving hole 22 where the block mold is not set up in cavity 31 installed on installation side 16 has flat shape for the extrusion part to the extent that can be used to position elongated structure S on the storage side to be formed. Sealed space is formed between cavity 31 of mold and thermoplastic resin sheet by using single mold without using split mold. Thermoplastic resin sheet should be formed by absorbing it from cavity 31 side.

On the other hand, when you two trays T for molding once, two thermoplastic resin sheets are arranged between split molds 10. When split mold 10 is clamp molded it should not be welded between projection parts 202 where each thermoplastic resin sheet is formed since projection part 202 that projects toward the opposed mold is molded. It is necessary to set the height of projection part 202, that is, the height of block mold 14 lower than the height of pinch-off part 38 so that the top part of projection part 202 is not welded mutually when it is compared between pinch-off parts 38. As mentioned above, by changing the storage goods in tray T, the mold that should be molded is changed. When it is necessary to exchange molds as per the situation, it is possible to deal efficiently only by changing the type of inserted piece 78 adopted in the first embodiment similar to this embodiment.

Though the embodiment of this invention is explained in detail above, if there are skilled persons, many changes and corrections are possible in the range which does not deviate from the range of this invention. Though middle part and end part of elongated structure of shaft is accommodated in this embodiment, inserted piece 78 is installed in concave part 74 of block mold and the concave part 74 installed on inserted piece 78 was assumed of the shape that can accommodate the edge or the middle part. Moreover, block mold is fixed with screw to flat installation surface 16 of base mold is explained in this embodiment, without being restricted to this, the concave part is installed on installation side 16 of base mold and the convex part which can be engaged with it is installed and is fixed with screw.

To achieve the above-mentioned problem, the mold of a tray made of a resin of this invention is the composition used to mold the resin material in the molten state which is arranged opposed to cavity. The mold of the tray made of the resin of this invention is a mold used to mold the tray made of the resin which stores elongated shaft of the circular section. It comprises the base mold which comprises the cavity that can install two or more block molds and it also comprises two or more molds installed in the cavity by selecting as per the specifications of the cavity to be molded. Respectively, two or more block molds have the length that corresponds to short length of the rectangular (two or more elongated structure storage) area. It also comprises the upper surface where the bottom and shaping surface that can touch the above-mentioned cavity. Respective edge or middle part of elongated structure has the size that can be installed in upper surface. Two or more concave portions that mutually separate a prescribed interval are installed in the longer direction. In addition, two or more inserted pieces that can be engaged with two or more concave portions are comprised. Two or more inserted pieces comprises upper surface composed of mold surfaces. As a result, above-mentioned two or more inserted pieces, inserted pieces from among above-mentioned two or more block molds necessary for molding and the block mold are selected according to the specification and the arrangement of elongated structure. Selected inserted piece to be engaged with the concave part of block mold is selected.

According to the mold of the tray made of the resin that has the above-mentioned composition, when the tray that mutually stores two or more elongated structures of shafts of the circular section are in parallel. The ditch where the whole of elongated structure is set is not installed in the storage area in the form that projects downward from the bottom of the tray. The point where the elongated structure can be positioned in storage area by setting middle part and edge of elongated structure in ditch formed in the part that project from floor space is used. The concave part of selected block mold on which selected inserted piece is to be engaged is selected. Shaping surface is composed of the upper surface of inserted piece set in the concave portion of the block mold and concave part of upper surface of block mold installed on the cavity of the base mold. It can be used to form the resin material in molten state installed opposite to cavity. Minor changes in specifications, e.g. shaft diameter, shaft length, position are made. As a result, when the number, arrangement or the position where elongated structure stored in the tray is supported is changed. Vertical arrangement of block mold in rectangular storage area is changed and concave part of block mold of inserted piece to be inserted of which arrangement is changed is changed. The block mold can be prepared flexibly without changing all the molds separately. As a result, the mold used to mold the tray that stores elongated structure shaft of the circular section can be efficiently prepared.

Moreover, above-mentioned two or more concave portions come off to the other side of the block mold respectively, and have the width that corresponds to the shaft diameter of elongated structure in above-mentioned two or more at least two block molds. Interval that corresponds near the length of above mentioned rectangular storage area is separately arranged opposite to other side. Above-mentioned two or more inserted pieces come off to the other side and they should comprises the type that provides the concave portion that has the width which corresponds to the shaft diameter of elongated structure and the type with almost flat above-mentioned upper surface. In addition, when shaft elongated structure has middle enlarged diameter, height from the surface of the above-mentioned cavity of the bottom of the above-mentioned concave portion is set more than the diameter of middle enlarged diameter in above mentioned inserted piece that is set in at least above-mentioned two or more block molds. As a result, both ends of elongated structure should be supported by the bottom of the above-mentioned concave portion of the above-mentioned corresponding block mold or the above-mentioned inserted piece.

Above mentioned cavity does not comprise flat surface where two or more screw holes in lattice of prescribed pitch. Respectively, above-mentioned two or more block molds have the penetration screw hole that can be fixed to the above-mentioned cavity in two or more screw holes by a fixed screw. In addition, it also comprises the screw that has the screw head installed in the edge of thread and the thread which can be screwed together in above-mentioned two or more screw holes. The above-mentioned screw is screwed together with the screw hole in which above-mentioned two or more block molds are not installed from above-mentioned two or more screw holes of the above-mentioned cavity. The above-mentioned screw hole should be closed with the above-mentioned screw head.

To achieve the above mentioned problem, the invention provides a method of molding the resin tray that stores a shaft of the circular section of elongated structure. It comprises the stage where the block mold that should be installed in the base mold according to the specification of the tray that should be molded is selected, inserted piece should be set in the concave portion of the selected block mold, the stage where the concave portion that should be set is selected, the stage where shaping surface is composed of the upper surface of the block mold and inserted piece fixed by fixing the selected block mold to the cavity of the base mold, and fixing selected inserted piece to the concave portion of the selected block mold, the stage arranged opposite to the above mentioned cavity so as to take out the thermoplastic resin material in the molten state from the above-mentioned cavity, the stage that dilutes the thermoplastic resin material in the molten state by pressing thermoplastic resin material in the molten state against the above-mentioned cavity. As a result, the ditch part where elongated structure is stored at a prescribed position of the thermoplastic resin material is formed with the upper surface of the above-mentioned block mold and the above-mentioned inserted piece on the other side and the side opposite to the cavity of the thermoplastic resin material. In addition, the cylindrical parison of the thermoplastic resin material pushed out of the upper side of the mold is acceptable.

REFERENCE NUMBERS

T Tray
S Elongated structure
10 Mold of tray made of resin
12 Base mold
14 Block mold
16 Installation side
18 Bottom
20 Side
22 Screw hole
24 Screw part
26 Fixing screw
28 Circular body
30 Extended block
32 Corner block
31 Cavity
34 Edge
36 Circular top part
38 Pinch-off part
40 Perpendicular part
42 Horizontal part
70 Bottom
72 Upper surface
74 Concave part
76 Other surface
80 Upper surface
82 Other side
84 Concave part
86 Other side
90 Ditch part
200 Bottom
202 Projection part
203 Surrounding wall

What is claimed is:

1. A method for manufacture of a resin tray comprising:
   installing surrounding wall block molds having a shaping surface comprised of a bottom surface and a side surface forming an L-shaped cross section on a base mold with at least one screw, wherein the surrounding wall block molds have a top portion extending up forming a pinch-off surface along their circumference;
   installing at least one projection part having a recess on the base mold within the surrounding wall block molds to form a mold cavity comprised of the surrounding wall block molds, the base mold, and the at least one projection part;
   arranging a molten thermoplastic resin sheet opposite the mold cavity;
   pushing said molten thermoplastic resin sheet against the mold cavity;
   cooling said molten thermoplastic resin sheet to form a tray having a recess on its surface configured to hold a part.

2. The method of claim 1 wherein said surrounding wall block molds comprise both linear block molds and corner block molds.

* * * * *